United States Patent
Liang et al.

(10) Patent No.: US 10,831,579 B2
(45) Date of Patent: Nov. 10, 2020

(54) ERROR DETECTING DEVICE AND ERROR DETECTING METHOD FOR DETECTING FAILURE OF HIERARCHICAL SYSTEM, COMPUTER READABLE RECORDING MEDIUM, AND COMPUTER PROGRAM PRODUCT

(71) Applicant: National Central University, Taoyuan (TW)

(72) Inventors: De-Ron Liang, Taipei (TW); Yen-Lin Lee, Taoyuan (TW); Wei-Jen Wang, Taoyuan (TW)

(73) Assignee: National Central University, Taoyuan (TW)

( * ) Notice: Subject to any disclaimer, the term of this patent is extended or adjusted under 35 U.S.C. 154(b) by 150 days.

(21) Appl. No.: 16/252,733

(22) Filed: Jan. 21, 2019

(65) Prior Publication Data

US 2020/0012551 A1 Jan. 9, 2020

(30) Foreign Application Priority Data

Jul. 9, 2018 (TW) .............................. 107123624 A

(51) Int. Cl.
*G06F 11/00* (2006.01)
*G06F 11/07* (2006.01)
(Continued)

(52) U.S. Cl.
CPC ...... *G06F 11/0751* (2013.01); *G06F 11/0706* (2013.01); *G06F 11/0784* (2013.01);
(Continued)

(58) Field of Classification Search
CPC ............. G06F 11/0706; G06F 11/0751; G06F 11/0784; G06F 11/079
See application file for complete search history.

(56) References Cited

U.S. PATENT DOCUMENTS 6,883,170 B1 * 4/2005 Garcia ................ G06F 11/1438
707/999.001
8,381,033 B2  2/2013 Franklin
(Continued)

FOREIGN PATENT DOCUMENTS

TW      200405175 A    4/2004
TW      I255109 B      5/2006
(Continued)

OTHER PUBLICATIONS

Office Action to the corresponding Taiwan Patent Application rendered by the Taiwan Intellectual Property Office (TIPO) dated Oct. 24, 2019, 9 pages (including English translation).
(Continued)

*Primary Examiner* — Charles Ehne
(74) *Attorney, Agent, or Firm* — Skaar Ulbrich Macari, P.A.

(57) ABSTRACT

An error detecting device for detecting failure of a hierarchical system comprises a detected signal receiving interface and a processor. The detected signal receiving interface receives a parent failure event occurring in the hierarchical system. If the processor diagnoses that the parent failure event is in a failure state, the detected signal receiving interface receives a first child failure event occurring in the hierarchical system. If the processor diagnoses that the parent failure event is not in the failure state, the detected signal receiving interface receives a second child failure event occurring in the hierarchical system. The parent failure event depends on the first child failure event. The second child failure event depends on the parent failure event. The processor sequentially diagnoses until the detected signal receiving interface receives one of the failure events at a bottom level in a binary search tree structure.

24 Claims, 4 Drawing Sheets

(51) Int. Cl.
*G06F 16/2455* (2019.01)
*G06F 16/22* (2019.01)

(52) U.S. Cl.
CPC ...... *G06F 11/0793* (2013.01); *G06F 16/2246* (2019.01); *G06F 16/2455* (2019.01)

(56) References Cited

U.S. PATENT DOCUMENTS

| | | | |
|---|---|---|---|
| 8,555,105 | B2 | 10/2013 | Goodwin et al. |
| 8,738,961 | B2 | 5/2014 | Jain et al. |
| 8,738,972 | B1 | 5/2014 | Bakman et al. |
| 8,892,627 | B2 | 11/2014 | Ellis |
| 8,983,961 | B2 | 3/2015 | Chan et al. |
| 9,537,720 | B1 | 1/2017 | Baggott et al. |
| 2003/0126299 | A1* | 7/2003 | Shah-Heydari ......... H04L 45/48 709/252 |
| 2005/0027829 | A1 | 2/2005 | Mukherjee |
| 2007/0242611 | A1 | 10/2007 | Archer et al. |
| 2009/0164849 | A1 | 6/2009 | Sugaya |
| 2013/0097183 | A1 | 4/2013 | McCracken |
| 2013/0198838 | A1 | 8/2013 | Schmidt et al. |
| 2015/0149835 | A1 | 5/2015 | Jayaraman |
| 2016/0253246 | A1* | 9/2016 | Chow ................. G06F 11/0706 714/19 |
| 2017/0068581 | A1 | 3/2017 | Qi et al. |

FOREIGN PATENT DOCUMENTS

| | | |
|---|---|---|
| TW | I265517 B | 11/2006 |
| TW | 200841189 A | 10/2008 |
| TW | 201137608 A | 11/2011 |
| TW | 201702874 A | 1/2017 |
| TW | 201717561 A | 5/2017 |

OTHER PUBLICATIONS

Gu Zhaojun, C. Wang, A Hierarchical Model of Network Fault Diagnosis. International Journal of Digital Content Technology and its Applications, vol. 5, No. 6, Jun. 2011, pp. 214-221, 8 pages.

L. Amati, Test and Diagnosis Strategies for Digital Devices: Methodologies and Tools, Doctoral Dissertation of: Luca Amati, 2011, 217 pages.

A. Avizienis, "Fault-tolerant systems", IEEE Trans. on Computers, vol. c-25, No. 12, Dec. 1976, pp. 1304-1312.

M. Shah et al., "Highly Available, Fault-Tolerant, Parallel Dataflows", SIGMOD, Paris, France, Jun. 13-18, 2004, 12 pages.

H. Alwi et al., "Fault Tolerant Control and Fault Detection and Isolation", Fault Detection and Fault-Tolerant Control Using Sliding Modes, Advances in Industrial Control, Chapter 2, pp. 7-27, Springer-Verlag London Limited 2011.

Fred B. Schneider, "Implementing Fault-Tolerant Services Using the State Machine Approach: A tutorial", ACM Computing Surveys, vol. 22, No. 4, Dec. 1990.

M. Aliouat and Z. Aliouat, "Recovery in Distributed Systems from Transient and Permanent Faults", Journal of Computer Science 3 (8): 617-623, 2007.

J. J. Gertler, "Survey of Model-Based Failure Detection and Isolation in Complex Plants," IEEE Control Systems Magazine, vol. 8, Issue 6, pp. 3-11, Dec. 1988.

Daniel P. Siewiorek, "Architecture of Fault-Tolerant Computers", IEEE Computer Society, vol. 17, Issue 8, pp. 9-18, Aug. 1984.

A. Schöll et al., "Efficient Algorithm-Based Fault Tolerance for Sparse Matrix Operations", 2016 46th Annual IEEE/IFIP International Conference on Dependable Systems and Networks (DSN), pp. 251-262.

D. K. Pradhan, "A New Class of Error-Correcting/Detecting Codes for Fault-Tolerant Computer Applications", IEEE Trans. on Computers, vol. c-29, No. 6, pp. 471-481, Jun. 1980.

S. Zhang, "Research on Improvement Algorithm of Image Edge Detection", Applied Mechanics and Materials, vol. 539 (2014), pp. 141-145.

T. Masuzawa et al., "Distributed Algorithms in Faulty Networks", 1988., IEEE International Symposium on Circuits and Systems, pp. 555-558.

* cited by examiner

ERROR DETECTING DEVICE AND ERROR DETECTING METHOD FOR DETECTING FAILURE OF HIERARCHICAL SYSTEM, COMPUTER READABLE RECORDING MEDIUM, AND COMPUTER PROGRAM PRODUCT

RELATED APPLICATIONS

This application claims priority to TW application No. 107123624, filed Jul. 9, 2018, which is herein incorporated by reference.

BACKGROUND

Field of Invention

The present invention relates to the field of computers. More particularly, the present invention relates to an error detecting device and an error detecting method for detecting failure of a hierarchical system, a computer readable recording medium, and a computer program product.

Description of Related Art

With the vigorous development of science technology and information industry, the failure of machines or systems will result in significant losses during the downtime, so there is an urgent need for companies to find way to reduce downtime similarly, the importance of fault-tolerant and high-availability system is also growing.

There are many diagnosing systems that provide fault-tolerant and high-availability services for the hierarchical system. The basic processes of these diagnosing systems are mostly to follow the way of performing the recovery mechanism after detecting errors. They can handle more than one error, some of these errors are independent, but some of these errors are dependent. In other words, it will also trigger the symptoms of other kinds of errors when an error occurs. Therefore, if it is not resolved, it will lead to miscarriage of justice.

To aforementioned situation, most of the existing system adopt the method of detecting all the error symptoms and then analyze them together. Although this method has ensured the correctness, it undoubtedly adds a lot of detection time. In addition, there are some errors may be "transition failures", which means it will recover itself after a period of time. This type of error usually requires more time to judge it is transition failure or permanent failure, so the detection time of this type of error is usually several times longer than the detection time of other errors.

SUMMARY

In view of the above, an object of the present invention is to provide an error detecting device and an error detecting method for detecting failure of a hierarchical system, a computer readable recording medium, and a computer program product. A tree-building algorithm is used to quickly diagnose the root cause of failures according to the dependencies of failures of the hierarchical system. Some observed failures may not be distinguished as the transition failures or the permanent failures. Therefore, the present invention only detects if there are any failures during diagnosis. If the failures may be the transition failures, a recovery portion is configured to distinguish the transition failures. In general, it is faster for only detecting if there are any failures. Therefore, the overall average diagnosing time can be greatly reduced.

A first aspect of present invention provides an error detecting device for detecting failure of a hierarchical system. Plural failure events occurring in the hierarchical system are dependent on each other. The error detecting device includes a detected signal receiving interface and a processor. The detected signal receiving interface receives the failure event with a highest dependency. The processor diagnoses a failure cause of the hierarchical system by using a tree-building algorithm according to the failure event with the highest dependency. When the processor diagnoses that the failure event with the highest dependency is in a failure state, the detected signal receiving interface receives a parent failure event at a top level in a binary search tree structure established by the tree-building algorithm. If the processor diagnoses that the parent failure event is in the failure state, the detected signal receiving interface receives a first child failure event at a next level in the binary search tree structure. If the processor diagnoses that the parent failure event is not in the failure state, the detected signal receiving interface receives a second child failure event at the next level in the binary search tree structure. The processor sequentially diagnoses until the detected signal receiving interface receives the failure event at a bottom level in the binary search tree structure. The parent failure event, the first child failure event, and the second child failure event occur in the hierarchical system. The parent failure event depends on the first child failure event. The second child failure event depends on the parent failure event.

A second aspect of present invention provides an error detecting method for detecting failure of a hierarchical system. Plural failure events occurring in the hierarchical system are dependent on each other. The error detecting method includes the following steps. The detected signal receiving interface receives the failure event with a highest dependency. The processor diagnoses a failure cause of the hierarchical system by using a tree-building algorithm according to the failure event with the highest dependency. When the processor diagnoses that the failure event with the highest dependency is in a failure state, the detected signal receiving interface receives a parent failure event at a top level in a binary search tree structure established by the tree-building algorithm. If the processor diagnoses that the parent failure event is in the failure state, the detected signal receiving interface receives a first child failure event at a next level in the binary search tree structure. If the processor diagnoses that the parent failure event is not in the failure state, the detected signal receiving interface receives a second child failure event at the next level in the binary search tree structure. The processor sequentially diagnoses until the detected signal receiving interface receives the failure event at a bottom level in the binary search tree structure. The parent failure event, the first child failure event, and the second child failure event occur in the hierarchical system. The parent failure event depends on the first child failure event. The second child failure event depends on the parent failure event.

A third aspect of present invention provides a computer readable recording medium with a program stored therein. After the error detecting device for detecting failure of the hierarchical system loads and executes the program from the computer readable recording medium, the method according to the second aspect is able to complete.

A fourth aspect of present invention provides a computer program product with a program stored therein. After the error detecting device for detecting failure of the hierarchical system loads and executes the program from the computer program product, the method according to the second aspect is able to complete.

DETAILED DESCRIPTION

To provide a better understanding of the present invention to users skilled in the technology of the present invention, embodiments are detailed as follows. The embodiments of the present invention are illustrated in the accompanying drawings with numbered elements to clarify the contents and effects to be achieved.

Figure 1:
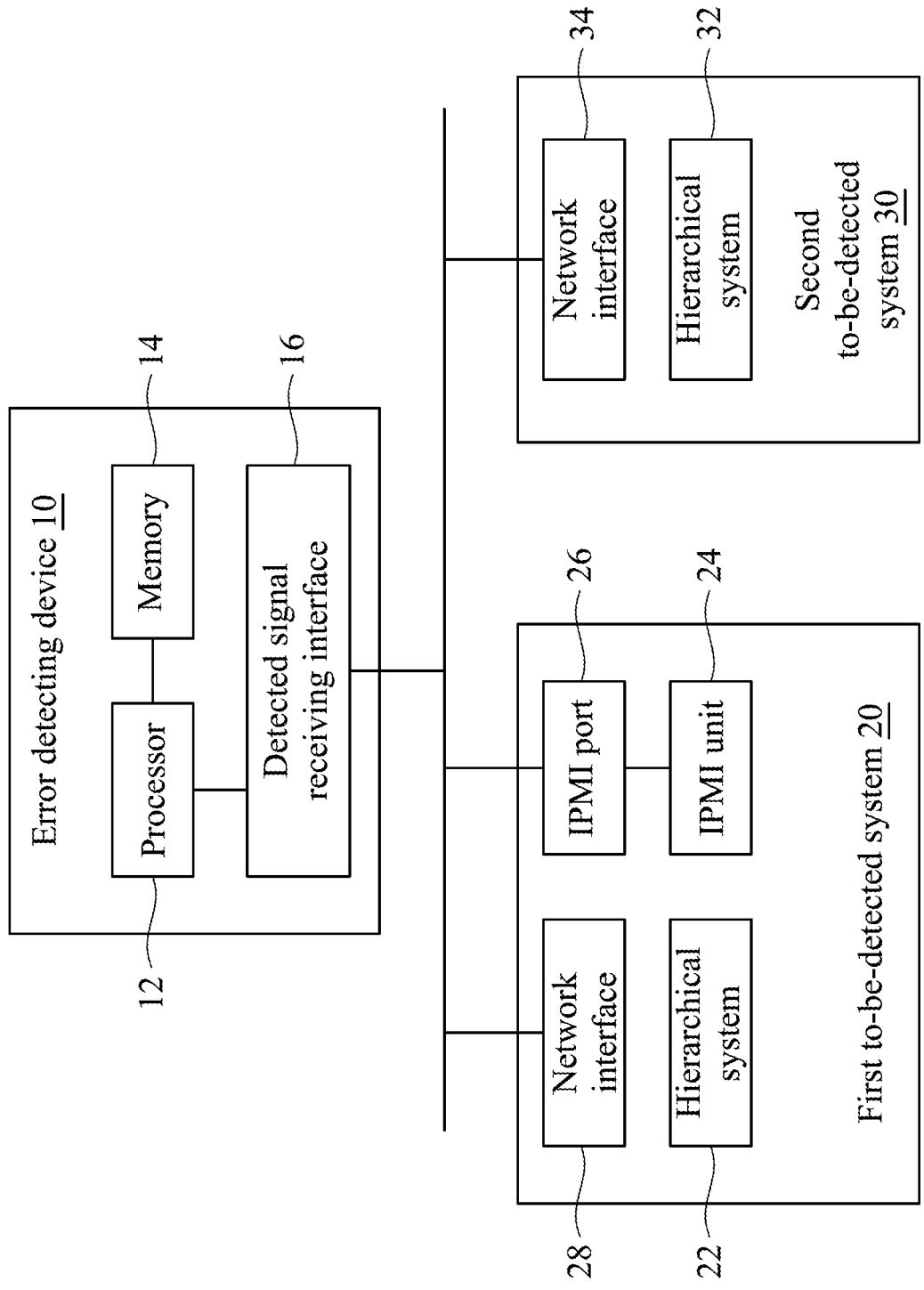
FIG. 1 illustrates a block diagram of an error detecting device for detecting failure of a hierarchical system according to the present invention.

FIG. 1 illustrates a block diagram of an error detecting device for detecting failure of a hierarchical system according to the present invention. In FIG. 1, the error detecting device 10 receives plural failure events of a first to-be-detected system 20 and a second to-be-detected system 30 through wired or wireless network. The first to-be-detected system 20 includes a hierarchical system 22. The second to-be-detected system 30 includes a hierarchical system 32. In FIG. 1, the first to-be-detected system 20 and the second to-be-detected system 30 are only for exemplary purposes and are not intended to limit the application of the present invention.

Figure 2:
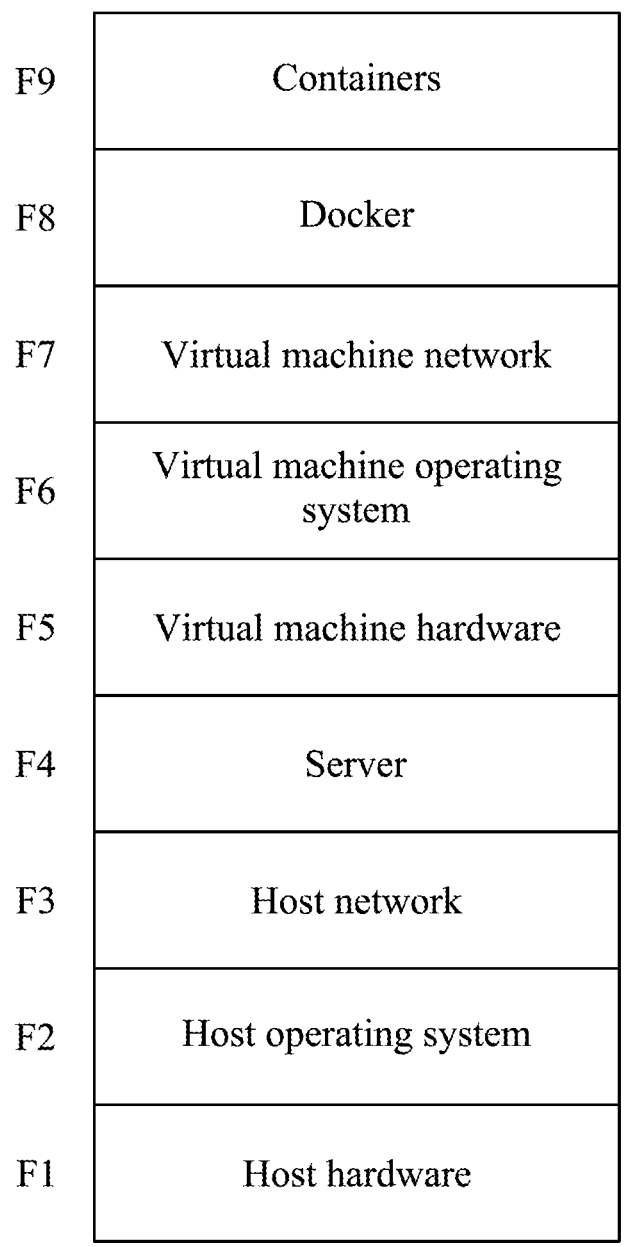
FIG. 2 illustrates a structural chart of the hierarchical system according to the present invention.

FIG. 2 illustrates a structural chart of the hierarchical system according to the present invention. In a structure of exemplary hierarchical system of FIG. 2, a host hardware is located at a bottom level of the hierarchical system, and a host operating system is constructed above the host hardware, and a host network is constructed above the host operating system. The remaining structure from bottom to top is: a server, a virtual machine hardware, a virtual machine operating system, a virtual machine network, Docker, and Containers. The structure of the hierarchical system of the present embodiment is only for exemplary purpose and is not intended to limit the application of the present invention.

In the example of FIG. 2, the failure event occurring in the host hardware is represented as F1, the failure event occurring in the host operating system is represented as F2, the failure event occurring in the host network is represented as F3, the failure events respectively occurring in the server, the virtual machine hardware, the virtual machine operating system, the virtual machine network, Docker, and Containers structured from bottom to top are represented as F4 to F9.

Since the host operating system, the host network, the sever, the virtual machine hardware, the virtual machine operating system, the virtual machine network, Docker, and Containers are structured above the host hardware, for example, when the host hardware fails, the host operating system, the host network, the sever, the virtual machine hardware, the virtual machine operating system, the virtual machine network, Docker, and Containers present symptoms of failure. In other words, the host operating system, the host network, the sever, the virtual machine hardware, the virtual machine operating system, the virtual machine network, Docker, and Containers are dependent on the host hardware. When the host operating system fails, the host network, the sever, the virtual machine hardware, the virtual machine operating system, the virtual machine network, Docker, and Containers present symptoms of failure, but the host hardware does not present symptoms of failure. In other words, the host network, the sever, the virtual machine hardware, the virtual machine operating system, the virtual machine network, Docker, and Containers are dependent on the host operating system. Therefore, when Containers fails, the host hardware, the host operating system, the host network, the sever, the virtual machine hardware, the virtual machine operating system, the virtual machine network, and Docker do not present symptoms of failure. In other words, Containers has a highest dependency in the hierarchical system. Once any level of the hierarchical system fails, Containers will present symptoms of failure.

Referring again to FIG. 1, the first to-be-detected system 20 includes the hierarchical system 22, an Intelligent Platform Management Interface (IPMI) unit 24, an IPMI port 26, and a network interface 28.

The IPMI unit 24 is a new generation of general interface standard which enable the hardware management to be "smart". A user can use IPMI to monitor plural physical characteristics of the server, such as temperature, voltage, fan operating status, supplying power, and chassis intrusion. When the IPMI unit 24 detects that the server of the hierarchical system 22 fails, the IPMI unit 24 transmits the failure event occurring in the server to an external network through the IPMI port 26.

For example, when a host loses the connection with a virtual machine, the host network of the hierarchical system 22 will present symptoms of failure. For example, a TCP/IP protocol is adopted to transmit a failure event occurring in the host network to the external network through the network interface 28. Similarly, a host network of the hierarchical system 32 of the second to-be-detected system 30 will present symptoms of failure. In other words, the TCP/IP protocol is adopted to transmit a failure event occurring in the host network to the external network through the network interface 34.

The error detecting device 10 includes a processor 12, a memory 14, and a detected signal receiving interface 16. The detected signal receiving interface 16 receives the failure events occurring in the hierarchical system 22 associated with the IPMI port 26 or the network interface 28 of the first to-be-detected system 20, or receives the failure events occurring in the hierarchical system 32 associated with the network interface 34 of the second to-be-detected system 30. The processor 12 uses a tree-building algorithm storing in the memory 14 to diagnose the failure causes of the hierarchical system 22 and the hierarchical system 32 according to the failure events received by the detected signal receiving interface 16.

One of the failure events occurring in the hierarchical system 22 and the hierarchical system 32 is a transition failure or a permanent failure. In this embodiment, a time length for diagnosing the transition failure is divided into a detecting time and a recovery time. The processor 12 first diagnoses during the detecting time. For example, it needs 30 seconds to detect the transition failure by adopting the heart beating. The time length for diagnosing the transition failure is divided into the detecting time of about 2 seconds and the recovery time of about 28 seconds.

When the processor 12 diagnoses that the failure cause of the hierarchical system 22 or the hierarchical system 32 is the transition failure, the processor 12 waits during the recovery time of the transition failure so as to wait for the hierarchical system 22 or the hierarchical system 32 to be successfully recovered. When the processor 12 diagnoses that the failure cause of the hierarchical system is the permanent failure or when the processor 12 waits for the hierarchical system 22 or the hierarchical system 32 to be recovered but cannot be successfully recovered, the processor 12 recovers the hierarchical system 22 or the hierarchical system 32 according to the failure cause.

Figure 3:
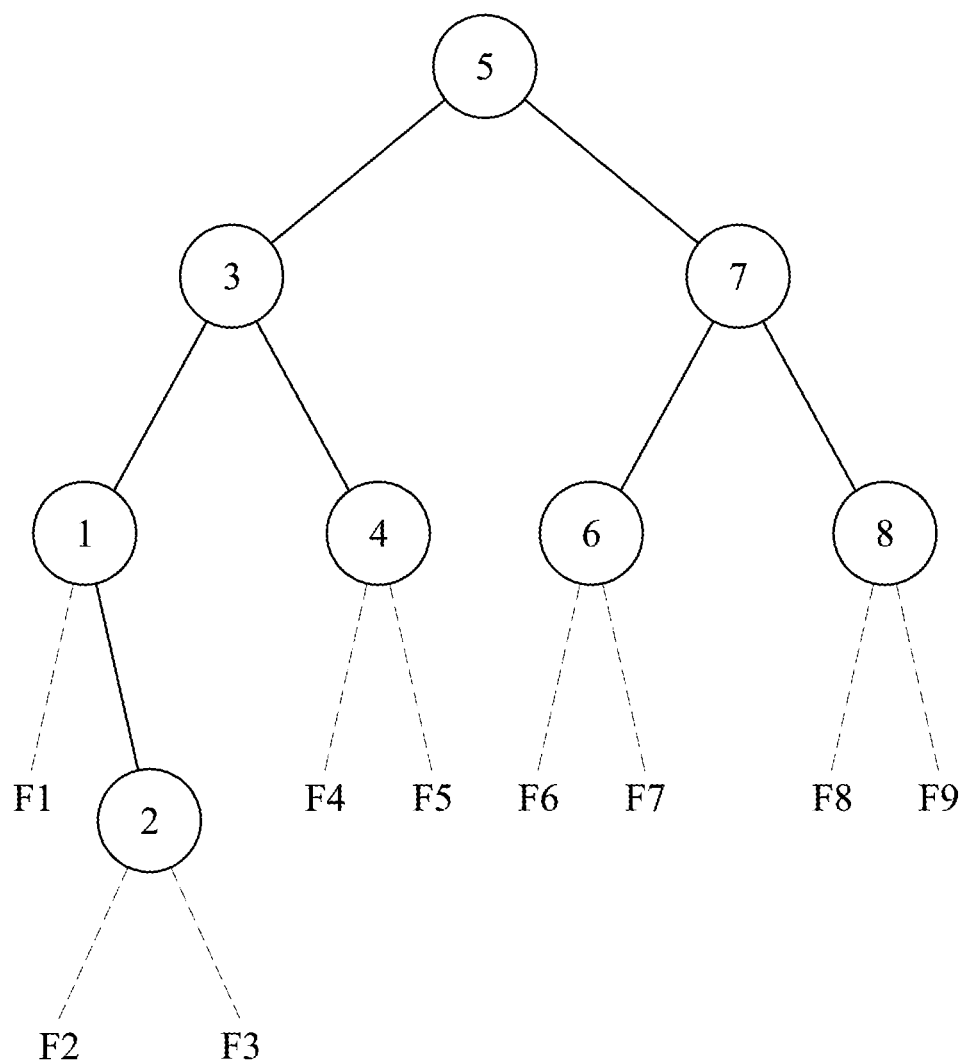
FIG. 3 illustrates a diagram of a binary search tree structure according to the present invention.

An established process of a binary search tree structure of the tree-building algorithm is stated as follow. The failure events occurring in the hierarchical system 22 and the hierarchical system 32 are sorted into a failure event sequence according to their dependencies. Taking FIG. 2 as the example, the failure event sequence is arranged according to the dependencies, and the failure event F1 of the host hardware has a lowest dependency, and the failure event F2 of the host operating system has a second lower dependency, and the failure event F9 of Containers has a highest dependency. An execution probability and a testing time of each of the failure events occurring in the hierarchical system 22 and the hierarchical system 32 are defined. For example, the testing time is about 3 seconds. Several kinds of the binary search tree structures are constructed according to the failure event sequence. Each of the binary search tree structures has the failure events dependent on each other. FIG. 3 is a diagram of the binary search tree structure of the present invention as an illustrative example (The node number in FIG. 3 is equivalent to the number of the failure event). The failure event F5 of the node 5 in the hierarchical system 22 and the hierarchical system 32 is used as a vertex node of the binary search tree structure. The failure events (e.g., the failure events F6, F7, F8, and F9) which depend on the failure event F5 constitute the nodes of the right branch of the binary search tree structure. The failure events (e.g., the failure events Ft F2, F3, and F4) which the failure event F5 depends on also constitute the nodes of the left branch of the binary search tree structure. The arrangement of the nodes of other sub-branches is as described above. An average detecting time of each of the binary search tree structures is calculated according to the execution probability and the testing time of each of the failure events, thereby finding the binary search tree structure which has a minimal average detecting time.

The average detecting time of each of the binary search tree structures is calculated by:

$$\text{the average detecting time} = \sum_{x=1}^{N-1} p(x)t(x)$$

"x" represents the number of one of the failure events occurring in the hierarchical system 22 and the hierarchical system 32, and x is from 1 to N−1. "N" represents the number of the failure event with the highest dependency, and the failure event N does not need to put into the binary search tree structure. "p(x)" represents the execution probability of the failure event x of the failure events occurring in the hierarchical system 22 and the hierarchical system 32. "t(x)" represents the testing time of the failure event x of the failure events.

The execution probability p(x) is calculated by:

$$p(x) = \sum_{i=j}^{k+1} h(i)$$

"h(i)" represents a probability for occurring the failure event i. "i" represents the number of each of the failure events contained in plural subtrees of the failure event x when establishing the binary search tree structure, and i is from j to k+1. According to the binary search tree structure, the number of the right node at a parent level of the node where the failure event is located is k+1, and the number of the left node is j−1 (it needs to find the node according to the binary search tree structure). Therefore, j can be obtained by adding 1 into the number of the left node at the parent level. The concept of the formula is that the execution probability p(x) of the detecting method of the failure event x is the sum of the probabilities for occurring the failures contained below the node of the failure event x in the binary search tree structure.

Referring again to FIG. 1, when the processor 12 diagnoses that the failure event F9 with the highest dependency (as shown in FIG. 2) is in a failure state, the failure event F5 of the vertex node 5 in the binary search tree structure in FIG. 3 is served as the failure event for initially diagnosing. The processor 12 makes a request or waits for the detected signal receiving interface 16 to receive the failure event F5 occurring in the hierarchical system 22 and the hierarchical system 32, in which the failure event F5 is transmitted through the network interface 28 and the network interface 34.

If the processor 12 diagnoses that the failure event F5 is in the failure state, the processor 12 continues to diagnose the failure event F3 of the node 3 (the left branch of FIG. 3), in which the failure event F5 depends on the failure event F3, and the processor 12 makes a request or waits for the detected signal receiving interface 16 to receive the failure event F3 occurring in the hierarchical system 22 and the hierarchical system 32, in which the failure event F3 is transmitted through the network interface 28 and the network interface 34. In contrast, if the processor 12 diagnoses that the failure event F5 is not in the failure state, the processor 12 continues to diagnose the failure event F7 of the node 7 (the right branch of FIG. 3), in which the failure event F7 depends on the failure event F5, and the processor 12 makes a request or waits for the detected signal receiving interface 16 to receive the failure event F7 occurring in the hierarchical system 22 and the hierarchical system 32, in which the failure event F7 is transmitted through the network interface 28 and the network interface 34.

If the processor 12 diagnoses that the failure event F7 is in the failure state, the processor 12 continues to diagnose the failure event F6 of the node 6 (the left branch of FIG. 3), in which the failure event F7 depends on the failure event F6, and the processor 12 makes a request or waits for the detected signal receiving interface 16 to receive the failure event F6 occurring in the hierarchical system 22 and the hierarchical system 32, in which the failure event F6 is transmitted through the network interface 28 and the network interface 34. In contrast, if the processor 12 diagnoses that the failure event F7 is not in the failure state, the processor 12 continues to diagnose the failure event F8 of the node 8 (the right branch of FIG. 3), in which the failure event F8 depends on the failure event F7, and the processor 12 makes a request or waits for the detected signal receiving interface 16 to receive the failure event F8 occurring in the hierarchical system 22 and the hierarchical system 32, in which the failure event F8 is transmitted through the network interface 28 and the network interface 34.

If the processor 12 diagnoses that the failure event F8 is in the failure state, as shown in FIG. 3, since the failure event F8 is in the failure state and does not have dependent failure events, the failure event F8 is located at the bottom level in the binary search tree structure. Therefore, the processor 12 diagnoses that the real failure cause of the hierarchical system 22 and the hierarchical system 32 is due to the Docker level, and thus the Docker level is recovered by using conventional techniques. If the processor 12 diagnoses that the failure event F8 is not in the failure state, as shown in FIG. 3, since the failure event F9 depends on the failure event F8 and does not have dependent failure events, the failure event F9 is located at the bottom level in the binary search tree structure. Therefore, the processor 12 diagnoses that the real failure cause of the hierarchical system 22 and the hierarchical system 32 is due to the Containers level, and thus the Containers level is recovered by using conventional techniques.

Similarly, the dependent failure events in aforementioned binary search tree structure are sequentially diagnosed until the failure event at the bottom level in the binary search tree structure so as to diagnose a failure level of the failure event corresponding to the real failure cause of the hierarchical system 22 and the hierarchical system 32, thereby recovering the failure level.

The binary search tree structure of the present invention of FIG. 3 is established according to the tree-building algorithm. First, it needs to provide plural testing times and plural execution probabilities of the failure events of other levels other than the level which the failure event with the highest dependency is located. Since these testing times are taken into consideration when establishing the binary search tree structure, as illustrated in FIG. 3, it needs to provide the testing times [1, 4, 1, 3, 1, 1, 1, 3] (respectively representing the testing times of the failure events F1-F8) and the execution probabilities [1/9, 1/9, 1/9, 1/9, 1/9, 1/9, 1/9, 1/9, 1/9] (respectively representing the execution probabilities of the failure events F1-F9), and then the tree-building algorithm is used to recursively calculated the binary search tree structure having the minimal average detecting time.

The method for calculating the average detecting times is to find the node position of each failure events from the binary search tree structure, and to calculate how many kinds of the failure events will be contained below the node position, and to multiply the execution probability p(x) by the testing time t(x) of corresponding failure events, and to be totaled finally. The occurrence probabilities of contained failure events are totaled as the execution probability p(x). The execution probability p(x) can be also calculated by finding the numbers of the right node and the left node at the upper level of the current node which the failure event is located (which needs to be found according to the binary search tree structure), and then totaling the occurrence probabilities of all failure events of the nodes between the right node and the left node (not including the left node), as illustrated in FIG. 3. The aforementioned calculating method for calculating the execution probability is suitable for the situation that the occurrence probabilities of all failure events are the same. If the occurrence probabilities of the failure events are different, the calculating method will be changed slightly. However, the situations of different occurrence probabilities of the failure events are also included in the scope of the claims of the present invention.

The failure event F1 is located at the position of the node 1. The bottom level below the node 1 includes the failure events F1, F2, and F3, and thus the execution probability p(x) of the failure event F1 is 1/9+1/9+1/9=3/9. The node 3 can be found at the right side of the upper level of the node 1, and there are no nodes at the left side of the upper level of the node 1. It can be assumed that the left side of the node 1 is the node 0, and the right side of the node 8 is the node 9 (not shown). Therefore, the left side of the upper level of the node 1 is the node 0. Thus, numbers among 3 and 0 contain numbers 1, 2, and 3, and the sum of the respectively occurrence probability is 3/9, which is the execution probability p(x). The testing time t(x) of the failure event F1 is 1 second, and thus 3/9*1=3/9.

The failure event F2 is located at the position of the node 2. The bottom level below the node 2 includes the failure events F2 and F3, and thus the execution probability p(x) of the failure event F2 is 1/9+1/9=2/9. The left side of the upper level of the node 2 is the node 1, and the right side of the upper level of the node 2 is the node 3. The contained nodes are the node 2 and the node 3, and the execution probability p(x) is 2/9. The testing time t(x) of the failure event F2 is 4 second, and thus 2/9*4=8/9.

The failure event F3 is located at the position of the node 3. The bottom level below the node 3 includes the failure events F1-F5, and thus the execution probability p(x) of the failure event F3 is 5/9. The left side of the upper level of the node 3 is the node 0 (the assumed node), and the right side of the upper level of the node 3 is the node 5. The contained nodes are the nodes 1-5, and the execution probability p(x) is 5/9. The testing time t(x) of the failure event F3 is 1 second, and thus 5/9*1=5/9.

The failure event F4 is located at the position of the node 4. The bottom level below the node 4 includes the failure events F4 and F5, and thus the execution probability p(x) of the failure event F4 is 2/9. The left side of the upper level of the node 4 is the node 3, and the right side of the upper level of the node 4 is the node 5. The contained nodes are the node 4 and the node 5, and the execution probability p(x) is 2/9. The testing time t(x) of the failure event F4 is 3 second, and thus 2/9*3=6/9.

The failure event F5 is located at the position of the node 5. The bottom level below the node 5 includes the failure events F1-F9, and thus the execution probability p(x) of the failure event F5 is 9/9=1. The left side of the upper level of the node 5 is the node 0 (the assumed node), and the right side of the upper level of the node 5 is the node 9. The contained nodes are the nodes 1-9, and the execution probability p(x) is 9/9=1. The testing time t(x) of the failure event F5 is 1 second, and thus 1*1=1.

The failure event F6 is located at the position of the node 6. The bottom level below the node 6 includes the failure events F6 and F7, and thus the execution probability p(x) of the failure event F6 is 2/9. The left side of the upper level of the node 6 is the node 5, and the right side of the upper level of the node 6 is the node 7. The contained nodes are the node 6 and the node 7, and the execution probability p(x) is 2/9. The testing time t(x) of the failure event F6 is 1 second, and thus 2/9*1=2/9.

The failure event F7 is located at the position of the node 7. The bottom level below the node 7 includes the failure events F6-F9, and thus the execution probability p(x) of the failure event F7 is 4/9. The left side of the upper level of the node 7 is the node 5, and the right side of the upper level of the node 7 is the node 9. The contained nodes are the nodes 6-9, and the execution probability p(x) is 4/9. The testing time t(x) of the failure event F7 is 1 second, and thus 4/9*1=4/9.

The failure event F8 is located at the position of the node 8. The bottom level below the node 8 includes the failure events F8 and F9, and thus the execution probability p(x) of the failure event F8 is 2/9. The left side of the upper level of the node 8 is the node 7, and the right side of the upper level of the node 8 is the node 9. The contained nodes are the node 8 and the node 9, and the execution probability p(x) is 2/9. The testing time t(x) of the failure event F8 is 3 second, and thus 2/9*3=6/9.

Therefore, all nodes of the binary search tree structure of FIG. 3 respectively multiply the execution probability p(x) by the testing time t(x), and then add up to 3/9+8/9+5/9+6/9+9/9+2/9+4/9+6/9=43/9 seconds, which is the average detecting time for about 4.78 seconds. It can be seen using the tree-building algorithm of the present invention to diagnose the failure cause of the hierarchical system can greatly reduce the diagnosing time.

Figure 4:
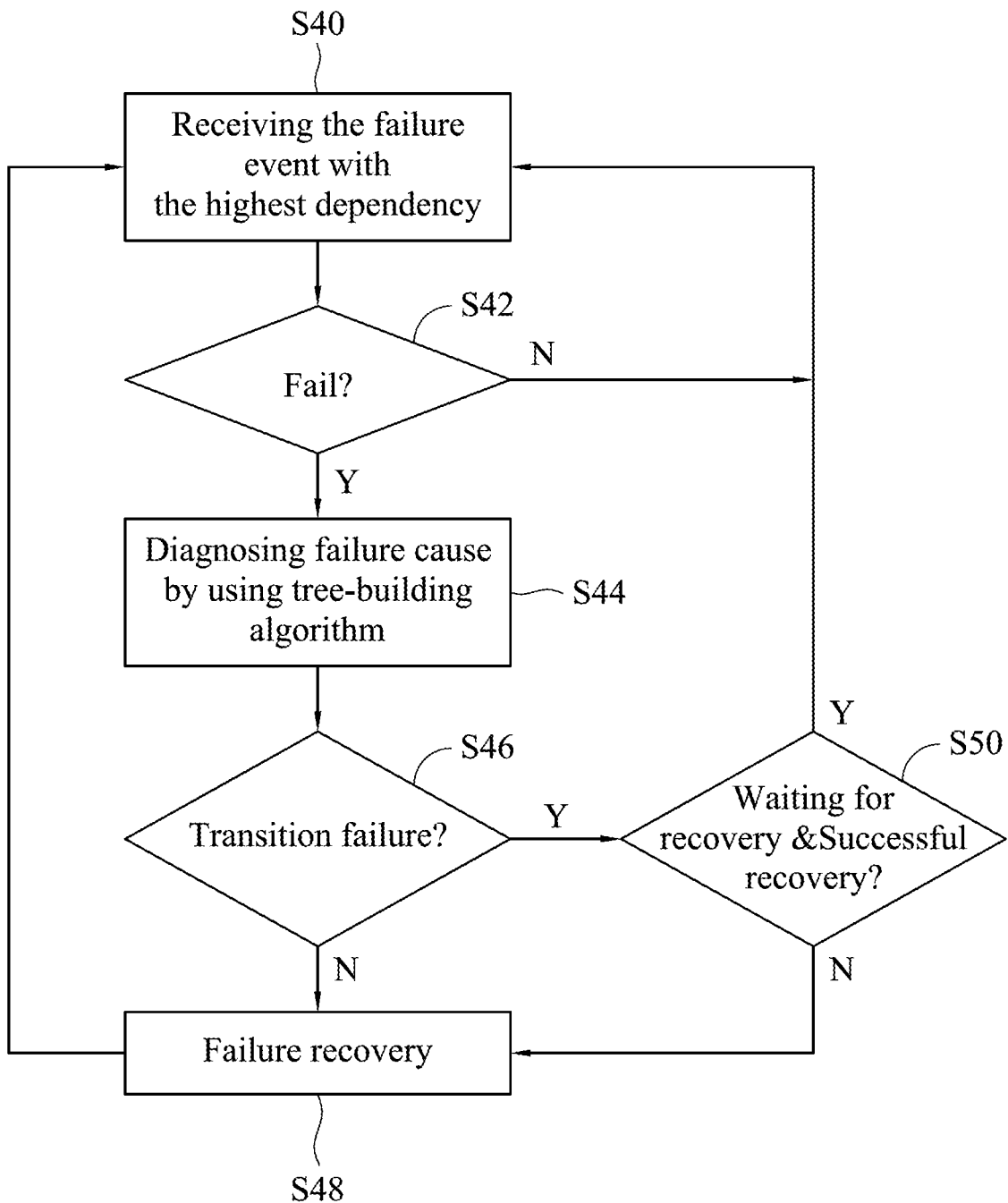
FIG. 4 illustrates a flow chart of an error detecting method for detecting failure of the hierarchical system according to the present invention.

FIG. 4 illustrates a flow chart of an error detecting method for detecting failure of the hierarchical system according to the present invention. In the following description of the process steps of FIG. 4, please also refer to the block diagram of FIG. 1, the structural chart of the hierarchical system of FIG. 2, and the diagram of the binary search tree structure of FIG. 3.

In FIG. 4, the detected signal receiving interface 16 receives the failure event F9 of the highest dependent Containers level of the hierarchical system 22 and the hierarchical system 32 through the network interface 28 and the network interface 34, as shown in FIG. 2, and then the received failure event F9 is transmitted to the processor 12 (the step S40).

If the failure event F9 is diagnosed to be failed, the processor 12 diagnoses the real failure cause of the hierarchical system 22 and the hierarchical system 32 by using the tree-building algorithm (the step S44).

Taking FIG. 3 as an example, when the processor 12 diagnoses that the failure event F9 with the highest dependency is in the failure state, the failure event F5 of the vertex node 5 in the binary search tree structure is served as the failure event for initially diagnosing. The processor 12 makes a request or waits for the detected signal receiving interface 16 to receive the failure event F5 occurring in the hierarchical system 22 and the hierarchical system 32, in which the failure event F5 is transmitted through the network interface 28 and the network interface 34.

If the processor 12 diagnoses that the failure event F5 is in the failure state, the processor 12 continues to diagnose the failure event F3 of the node 3 (the left branch of FIG. 3), in which the failure event F5 depends on the failure event F3, and the processor 12 makes a request or waits for the detected signal receiving interface 16 to receive the failure event F3 occurring in the hierarchical system 22 and the hierarchical system 32, in which the failure event F3 is transmitted through the network interface 28 and the network interface 34. If the processor 12 diagnoses that the failure event F5 is not in the failure state, the processor 12 continues to diagnose the failure event F7 of the node 7 (the right branch of FIG. 3), in which the failure event F7 depends on the failure event F5, and the processor 12 makes a request or waits for the detected signal receiving interface 16 to receive the failure event F7 occurring in the hierarchical system 22 and the hierarchical system 32, in which the failure event F7 is transmitted through the network interface 28 and the network interface 34.

Therefore, if the processor 12 diagnoses that the parent failure event is in the failure state, the processor 12 continues to diagnose the first child failure event which the parent failure event depends on, and the processor 12 makes a request or waits for the detected signal receiving interface 16 to receive the first child failure event occurring in the hierarchical system 22 and the hierarchical system 32, in which the first child failure event is transmitted through the network interface 28 and the network interface 34. If the processor 12 diagnoses that the parent failure event is not in the failure state, the processor 12 continues to diagnose the second child failure event dependent on the parent failure event, and the processor 12 makes a request or waits for the detected signal receiving interface 16 to receive the second child failure event occurring in the hierarchical system 22 and the hierarchical system 32, in which the second child failure event is transmitted through the network interface 28 and the network interface 34. Thus, the processor 12 sequentially diagnoses the failure events until one actually failed failure event of the failure events F1-F9, in which the actually failed failure event is at the bottom level in the binary search tree structure of FIG. 3.

When the processor 12 diagnoses the actually failed failure event, the processor 12 determines whether the failure event is the transition failure (the step S46). If the processor 12 determines that the failure event is not the transition failure, that is, the failure event is permanent failure (e.g., the host operating system is failed), a conventional corresponding recovery process is performed according to the failure cause of the failure event (the step S48). Thereafter, returning to the step S40, the detected signal receiving interface 16 receives the failure event F9 with the highest dependency.

If the processor 12 diagnoses that the failure event is the transition failure, then waiting for a recovery time of the transition failure, and then the processor 12 makes a request or wait for the detected signal receiving interface 16 to receive the transition failure event occurring at the failed level of the hierarchical system 22 and the hierarchical system 32, in which the transition failure event is transmitted through the network interface 28 and the network interface 34, and the processor 12 determines whether the failed level corresponding to the transition failure event is successfully recovered (the step S50).

If the processor 12 determines that the failed level corresponding to the transition failure event is successfully recovered, returning to the step S40, the detected signal receiving interface 16 receives the failure event F9 with the highest dependency. If the processor 12 determines that the failed level corresponding to the transition failure event is not successfully recovered, then performing the step S48, a conventional corresponding recovery process is performed according to the failure cause of the transition failure event.

The aforementioned error detecting method of the hierarchical system of the present invention may be implemented by using a program, and the program may be stored in a computer readable recording medium; after loading the program from the computer readable recording medium and executing the program, the error detecting device for detecting failure of the hierarchical system is capable of performing the method steps described above and shown in the drawings.

Similarly, the error detecting method of the hierarchical system of the present invention may be implemented by using a program product; for example, after loading the program product on the Internet, and executing the program product, the error detecting device for detecting failure of the hierarchical system is capable of performing the method steps described above and shown in the drawings.

The present invention provides an error detecting device and an error detecting method for detecting failure of a hierarchical system, a computer readable recording medium, and a computer program product, which are characterized in that: a tree-building algorithm is used to quickly diagnose the root cause of failures according to the dependencies of failures of the hierarchical system, some observed failures may not be distinguished as the transition failures or the permanent failures. Therefore, the present invention only detects if there are any failures during diagnosis. If the failures may be the transition failures, a recovery portion is configured to distinguish the transition failures. In general, it is faster for only detecting if there are any failures, and thus the overall average diagnosing time can be greatly reduced.

Although the present invention has been described above with reference to the exemplary embodiments and exemplary drawings, the exemplary embodiments and exemplary drawings should not be regarded as a limitation. Various modifications, omissions, and variations that are made by a person skilled in the art on the form and embodiments of the present invention do not depart from the scope claimed by the present invention.

What is claimed is:

1. An error detecting device for detecting failure of a hierarchical system, wherein a plurality of failure events occurring in the hierarchical system are dependent on each other, wherein the error detecting device comprises:
    a detected signal receiving interface configured to receive the failure event with a highest dependency; and
    a processor configured to diagnose a failure cause of the hierarchical system by using a tree-building algorithm according to the failure event with the highest dependency;
    wherein when the processor diagnoses that the failure event with the highest dependency is in a failure state, the detected signal receiving interface receives a parent failure event at a top level in a binary search tree structure established by the tree-building algorithm, and then:
        if the processor diagnoses that the parent failure event is in the failure state, the detected signal receiving interface receives a first child failure event at a next level in the binary search tree structure;
        if the processor diagnoses that the parent failure event is not in the failure state, the detected signal receiving interface receives a second child failure event at the next level in the binary search tree structure; and
        the processor sequentially diagnoses until the detected signal receiving interface receives the failure event at a bottom level in the binary search tree structure;
    wherein the parent failure event, the first child failure event, and the second child failure event occur in the hierarchical system, wherein the parent failure event depends on the first child failure event, wherein the second child failure depends on the parent failure event.

2. The error detecting device of claim 1, wherein one of the failure events is a transition failure or a permanent failure.

3. The error detecting device of claim 2, wherein a time length for diagnosing the transition failure is divided into a detecting time and a recovery time, wherein the processor diagnoses during the detecting time.

4. The error detecting device of claim 3, wherein:
    when the processor diagnoses that the failure cause of the hierarchical system is the transition failure, the processor waits during the recovery time so as to wait for the hierarchical system to be successfully recovered; and
    when the processor diagnoses that the failure cause of the hierarchical system is the permanent failure or when the processor waits for the hierarchical system but cannot be successfully recovered, the hierarchical system is recovered according to the failure cause.

5. The error detecting device of claim 1, wherein the binary search tree structure is established by:
    sorting the failure events into a failure event sequence according to their dependencies;
    defining an execution probability and a testing time of each of the failure events;
    constructing a plurality of binary search tree structures according to the failure event sequence, wherein each of the binary search tree structures has the failure events dependent on each other;
    calculating an average detecting time of each of the binary search tree structures according to the execution probability and the testing time of each of the failure events; and
    finding the binary search tree structure having a minimal average detecting time.

6. The error detecting device of claim 5, wherein the average detecting time of each of the binary search tree structures is calculated by:

$$\text{the average detecting time} = \sum_{x=1}^{N-1} p(x)t(x)$$

wherein "x" represents the number of one of the failure events, and x is from 1 to N−1; wherein "N" represents the number of the failure event with the highest dependency, and the failure event N does not need to put into the binary search tree structure; wherein "p(x)" represents the execution probability of the failure event x; wherein "t(x)" represents the testing time of the failure event x;

wherein the execution probability p(x) is calculated by:

$$p(x) = \sum_{i=j}^{k+1} h(i)$$

wherein "h(i)" represents a probability for occurring the failure event i; wherein "i" represents the number of each of the failure events contained in a plurality of subtrees of the failure event x when establishing the binary search tree structure, and i is from j to k+1, wherein the number of a right node at a parent level of a node where the failure event is located is k+1, and the number of a left node at the parent level of the node where the failure event is located is j−1.

7. An error detecting method for detecting failure of a hierarchical system, wherein a plurality of failure events occurring in the hierarchical system are dependent on each other, wherein the error detecting method comprises:
    receiving the failure event with a highest dependency through a detected signal receiving interface; and
    diagnosing a failure cause of the hierarchical system through a processor by using a tree-building algorithm according to the failure event with the highest dependency;

wherein when the processor diagnoses that the failure event with the highest dependency is in a failure state, the detected signal receiving interface receives a parent failure event at a top level in a binary search tree structure established by the tree-building algorithm, and then:
  if the processor diagnoses that the parent failure event is in the failure state, the detected signal receiving interface receives a first child failure event at a next level in the binary search tree structure;
  if the processor diagnoses that the parent failure event is not in the failure state, the detected signal receiving interface receives a second child failure event at the next level in the binary search tree structure; and
  the processor sequentially diagnoses until the detected signal receiving interface receives the failure event at a bottom level in the binary search tree structure;
wherein the parent failure event, the first child failure event, and the second child failure event occur in the hierarchical system, wherein the parent failure event depends on the first child failure event, wherein the second child failure depends on the parent failure event.

8. The error detecting method of claim 7, wherein one of the failure events is a transition failure or a permanent failure.

9. The error detecting method of claim 8, wherein a time length for diagnosing the transition failure is divided into a detecting time and a recovery time, wherein the processor diagnoses during the detecting time.

10. The error detecting method of claim 9, wherein after diagnosing the failure cause of the hierarchical system through the processor, the error detecting method further comprises:
  when the processor diagnoses that the failure cause of the hierarchical system is the transition failure, the processor waits during the recovery time so as to wait for the hierarchical system to be successfully recovered; and
  when the processor diagnoses that the failure cause of the hierarchical system is the permanent failure or when the processor waits for the hierarchical system but cannot be successfully recovered, the hierarchical system is recovered according to the failure cause.

11. The error detecting method of claim 7, wherein the binary search tree structure is established by:
  sorting the failure events into a failure event sequence according to their dependencies;
  defining an execution probability and a testing time of each of the failure events;
  constructing a plurality of binary search tree structures according to the failure event sequence, wherein each of the binary search tree structures has the failure events dependent on each other;
  calculating an average detecting time of each of the binary search tree structures according to the execution probability and the testing time of each of the failure events; and
  finding the binary search tree structure having a minimal average detecting time.

12. The error detecting method of claim 11, wherein the average detecting time of each of the binary search tree structures is calculated by:

$$\text{the average detecting time} = \sum_{x=1}^{N-1} p(x)t(x)$$

wherein "x" represents the number of one of the failure events, and x is from 1 to N−1; wherein "N" represents the number of the failure event with the highest dependency, and the failure event N does not need to put into the binary search tree structure; wherein "p(x)" represents the execution probability of the failure event x; wherein "t(x)" represents the testing time of the failure event x;
wherein the execution probability p(x) is calculated by:

$$p(x) = \sum_{i=j}^{k+1} h(i)$$

wherein "h(i)" represents a probability for occurring the failure event i; wherein "i" represents the number of each of the failure events contained in a plurality of subtrees of the failure event x when establishing the binary search tree structure, and i is from j to k+1, wherein the number of a right node at a parent level of a node where the failure event is located is k+1, and the number of a left node at the parent level of the node where the failure event is located is j−1.

13. A computer readable recording medium with a program stored therein, wherein after the error detecting device for detecting failure of the hierarchical system loads and executes the program from the computer readable recording medium, the method according to claim 7 is able to complete.

14. The computer readable recording medium of claim 13, wherein one of the failure events is a transition failure or a permanent failure.

15. The computer readable recording medium of claim 14, wherein a time length for diagnosing the transition failure is divided into a detecting time and a recovery time, wherein the processor diagnoses during the detecting time.

16. The computer readable recording medium of claim 15, wherein after diagnosing the failure cause of the hierarchical system through the processor, the error detecting method further comprises:
  when the processor diagnoses that the failure cause of the hierarchical system is the transition failure, the processor waits during the recovery time so as to wait for the hierarchical system to be successfully recovered; and
  when the processor diagnoses that the failure cause of the hierarchical system is the permanent failure or when the processor waits for the hierarchical system but cannot be successfully recovered, the hierarchical system is recovered according to the failure cause.

17. The computer readable recording medium of claim 13, wherein the binary search tree structure is established by:
  sorting the failure events into a failure event sequence according to their dependencies;
  defining an execution probability and a testing time of each of the failure events;
  constructing a plurality of binary search tree structures according to the failure event sequence, wherein each of the binary search tree structures has the failure events dependent on each other;
  calculating an average detecting time of each of the binary search tree structures according to the execution probability and the testing time of each of the failure events; and
  finding the binary search tree structure having a minimal average detecting time.

18. The computer readable recording medium of claim 17, wherein the average detecting time of each of the binary search tree structures is calculated by:

$$\text{the average detecting time} = \sum_{x=1}^{N-1} p(x)t(x)$$

wherein "x" represents the number of one of the failure events, and x is from 1 to N−1; wherein "N" represents the number of the failure event with the highest dependency, and the failure event N does not need to put into the binary search tree structure; wherein "p(x)" represents the execution probability of the failure event x; wherein "t(x)" represents the testing time of the failure event x;

wherein the execution probability p(x) is calculated by:

$$p(x) = \sum_{i=j}^{k+1} h(i)$$

wherein "h(i)" represents a probability for occurring the failure event i; wherein "i" represents the number of each of the failure events contained in a plurality of subtrees of the failure event x when establishing the binary search tree structure, and i is from j to k+1, wherein the number of a right node at a parent level of a node where the failure event is located is k+1, and the number of a left node at the parent level of the node where the failure event is located is j−1.

19. A computer program product with a program stored therein, wherein after the error detecting device for detecting failure of the hierarchical system loads and executes the program from the computer program product, the method according to claim 7 is able to complete.

20. The computer program product of claim 19, wherein one of the failure events is a transition failure or a permanent failure.

21. The computer program product of claim 20, wherein a time length for diagnosing the transition failure is divided into a detecting time and a recovery time, wherein the processor diagnoses during the detecting time.

22. The computer program product of claim 21, wherein after diagnosing the failure cause of the hierarchical system through the processor, the error detecting method further comprises:

when the processor diagnoses that the failure cause of the hierarchical system is the transition failure, the processor waits during the recovery time so as to wait for the hierarchical system to be successfully recovered; and when the processor diagnoses that the failure cause of the hierarchical system is the permanent failure or when the processor waits for the hierarchical system but cannot be successfully recovered, the hierarchical system is recovered according to the failure cause.

23. The computer program product of claim 19, wherein the binary search tree structure is established by:

sorting the failure events into a failure event sequence according to their dependencies;

defining an execution probability and a testing time of each of the failure events;

constructing a plurality of binary search tree structures according to the failure event sequence, wherein each of the binary search tree structures has the failure events dependent on each other;

calculating an average detecting time of each of the binary search tree structures according to the execution probability and the testing time of each of the failure events; and finding the binary search tree structure having a minimal average detecting time.

24. The computer program product of claim 23, wherein the average detecting time of each of the binary search tree structures is calculated by:

$$\text{the average detecting time} = \sum_{x=1}^{N-1} p(x)t(x)$$

wherein "x" represents the number of one of the failure events, and x is from 1 to N−1; wherein "N" represents the number of the failure event with the highest dependency, and the failure event N does not need to put into the binary search tree structure; wherein "p(x)" represents the execution probability of the failure event x; wherein "t(x)" represents the testing time of the failure event x;

wherein the execution probability p(x) is calculated by:

$$p(x) = \sum_{i=j}^{k+1} h(i)$$

wherein "h(i)" represents a probability for occurring the failure event i; wherein "i" represents the number of each of the failure events contained in a plurality of subtrees of the failure event x when establishing the binary search tree structure, and i is from j to k+1, wherein the number of a right node at a parent level of a node where the failure event is located is k+1, and the number of a left node at the parent level of the node where the failure event is located is j−1.

\* \* \* \* \*